Patented Jan. 29, 1935

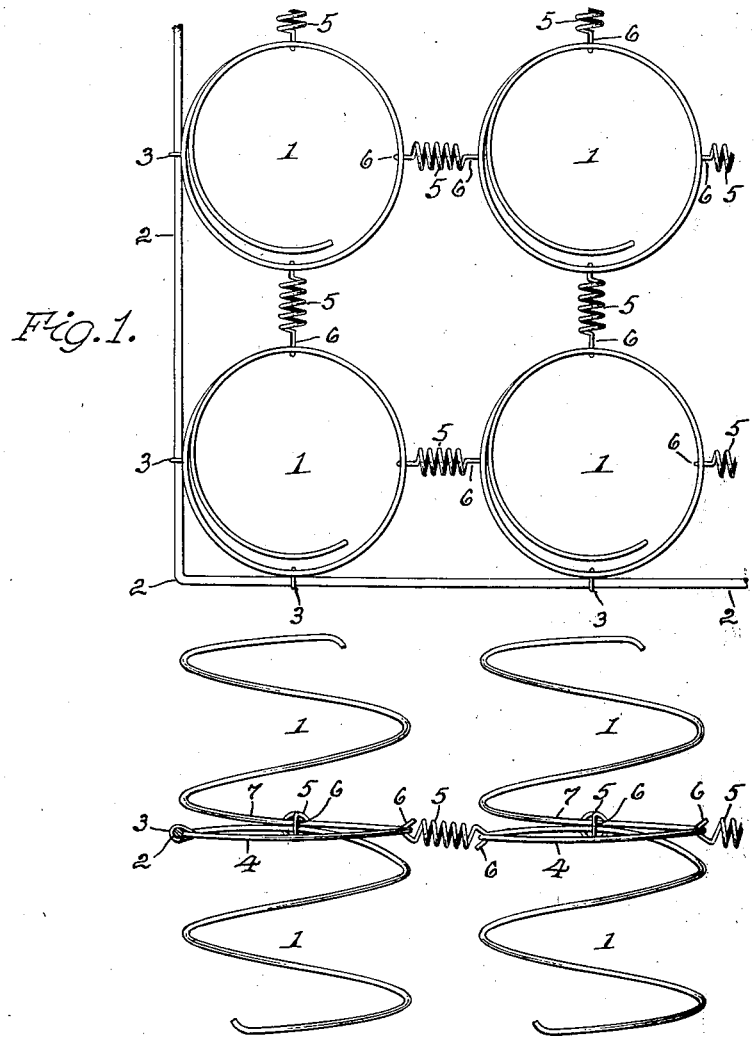

1,989,302

UNITED STATES PATENT OFFICE 1,989,302

SPRING STRUCTURE

William H. Wilmot, Asheville, N. C.

Application May 10, 1933, Serial No. 670,228

3 Claims. (Cl. 5—252)

This invention relates to spring structures for mattresses, cushions and backs for seats, and similar uses, which structures include a plurality of springs, each formed of a single coil of wire and all assembled in side by side relation within the structure.

The main object of the present invention is to provide a spring structure of this character in which the several coiled springs are so formed and held within the assembly as to provide the maximum of free yieldability, and to make the mattress cushion or other device of which this spring structure forms a part, very soft and pliable, even to the extent of making the structure suitable for use in an article, such as a pillow.

A further object is to provide means for connecting and holding the several coiled springs in proper place and relation within the spring structure, such means being positioned and arranged to connect the several springs together midway of their lengths only, thus leaving the end portions of the several springs free and unconnected to provide extreme flexibility thereof both longitudinally and laterally.

It is also an object to provide a spring structure suitable for the purpose, which is very light in weight, simple in construction and cheap to manufacture, and which embodies certain new and useful features in the construction, combination and arrangement of parts, all as hereinafter more fully described, reference being had to the accompanying drawing, in which—

Figure 1 is a plan view of a portion of a spring structure illustrative of an embodiment of the present invention;

Fig. 2 is a side elevation of the same, showing the margin frame thereof in section; and Fig. 3 is a detail view showing a central portion of one of the springs shown in Figure 2 and looking in a direction at right angles to that of said figure.

The spring structure, whether it be of a size and shape to form the spring structure for a seat, mattress, or other device, includes a plurality of coiled springs each indicated as a whole by the numeral 1 and each formed from a single wire. These several springs are confined within a marginal frame 2 consisting of a heavy wire bent to conform to the outline of the device to which the spring structure is to be applied, this frame surrounding the assembled springs and extending in a plane transversely of the longitudinal axes of the springs and located midway between the planes of the extreme ends of said springs. This single frame member thus forms the margin or outline of the structure as a whole and lies in a plane midway between what may be termed, for convenience, the upper and lower sides of said structure, surrounding the assembled springs to confine them within the desired area and to form means to which those springs along the frame may be secured.

The several springs 1 are located within the frame 2 in spaced apart relation, those adjacent the frame being secured thereto, each by a clip 3 or the like embracing the frame and a central turn or coil 4 of the spring which is the coil that is at the center of the spring or midway between its extreme ends, and connecting each of the springs with adjacent springs throughout the structure, are short coiled springs 5 of small diameter having ends forming hooks 6 to hook over the central turns 4 and yieldingly connect the several springs in substantially the central plane of the structure and plane of said frame.

To bring the turns 4 of the several springs into substantially a horizontal plane and the plane of said marginal frame, and thus form a base for the several free turns of each spring at the upper and lower ends of each spring above and below this plane, to hold these end portions in an upright position or with the axes of the springs at right angles to said plane, this coil 4 of each spring at one side thereof is connected to an adjacent side of an adjacent turn 7 by hooking the hook 6 of one of the connecting coils 5 over both of these turns, thus drawing them together at that side and deflecting one or both turns out of their normal position and eliminating the tendency of the spring to tilt laterally, which would be the tendency if the spring was connected to an adjacent spring or springs by a connection engaged with a single turn extending in its normal inclined direction. By securing two adjacent turns together at one side, the turns are deflected into the plane of the frame 2 and thus this deflected turn or turns provide what may be termed a base for the free end portions of each spring at each side of this base, which base is held, by its connection with the other springs and frame, in a substantially horizontal plane to hold said spring in an upright position or with its axis extending at right angles to the plane of the frame.

The end turns of each spring above and below such base or at each side of the plane of the holding frame, are thus left perfectly free to yield in any direction, and as each spring is formed of a single wire, when the structure is assembled in upholstery, cushions, mattresses and the like, both sides of the cushion or other product, are very soft and yielding because of this free yieldability of the springs, providing a coiled spring assembly which may, by making the springs of small wire, be used in pillows or similar devices where softness is essential.

Further, by connecting the several springs within a marginal frame formed of a single wire or the like and located midway between the top and bottom surfaces of the finished product, this frame does not give undue stiffness or rigidity to the product at a part thereof where it will make the product uncomfortable to sit upon or lie against, the margins of the surfaces of the mattress pillow or other device being just as soft and yielding as the central portions of such surfaces. This spring structure when applied to any form of upholstering and covered by the usual padding and fabric covering, provides a very soft, yieldable filling as said springs are yieldingly held in proper assembled relation without the necessity for attaching the ends of the springs to the enclosing covering.

Obviously any suitable form of clips for attaching the springs to the frame and any suitable form of connection between the several springs may be employed without departing from the spirit of the invention, and such changes are contemplated.

What I claim is:—

1. A spring structure including a plurality of coiled springs, and means connecting adjacent turns midway of the length of each spring, by deflecting said adjacent turns toward each other at one side of said turns and engaging said means therewith at their point of nearest approach to each other and engaging said means with turns of adjacent springs, said connecting means and deflected turns of the several springs extending in substantially the same horizontal plane midway of the lengths of said springs, with the turns of each spring at each side of said plane unconnected with the other springs.

2. A spring structure including a plurality of coiled springs each formed of a single, continuous, spiral wire with adjacent turns of said spiral midway of the length of each spring, deflected toward each other and secured together at one meeting point thereof and connected to a turn of an adjacent spring by short coiled springs formed with end hooks to embrace said turns with said short springs under tension, the turns of each spring at each side of said midway turns, being unconnected to other springs and the ends of these springs being free.

3. A spring structure including a plurality of springs each formed of a continuously coiled wire and set in said structure in spaced apart relation with the ends of the wire free, a margin frame member, means for securing to said member, a midway turn of each of the springs adjacent thereto, midway adjacent turns of each spring being deflected to contact each other at one point, and means comprising small coiled springs having open end hooks to receive and secure at their points of contact midway turns of each spring together and to hook over a midway turn of an adjacent spring to connect all of said springs together in a common midway plane of said structure.

WILLIAM H. WILMOT.